United States Patent [19]

Richards

[11] 3,772,477

[45] Nov. 13, 1973

[54] TELEPHONE DIAL PULSE DETECTION CIRCUIT

[75] Inventor: Lee Wise Richards, Wheaton, Ill.

[73] Assignee: Bell Telephone Laboratories, Incorporated, Murray Hill, N.J.

[22] Filed: July 17, 1972

[21] Appl. No.: 272,294

[52] U.S. Cl. .......... 179/16 EA, 179/18 FA, 328/164

[51] Int. Cl. .......................... H04m 3/22, H04q 1/36

[58] Field of Search ....................... 179/16 E, 16 EA, 179/17 A, 18 F, 18 FA; 178/70 R, 70 TS; 328/164

[56] References Cited

UNITED STATES PATENTS

| | | | |
|---|---|---|---|
| 3,622,709 | 11/1971 | Tjaden | 179/18 F |
| 3,205,312 | 9/1965 | Brightman et al. | 179/18 F |

FOREIGN PATENTS OR APPLICATIONS

| | | | |
|---|---|---|---|
| 1,201,093 | 8/1970 | Great Britain | 179/18 FA |

*Primary Examiner*—Kathleen H. Claffy
*Assistant Examiner*—Randall P. Myers
*Attorney*—W. L. Keefauver et al.

[57] ABSTRACT

A telephone dial pulse detection circuit for reconstructing dial pulse signals in the presence of externally induced alternating current on an unbalanced line. The signals are initially applied to an active, low-pass, saturating filter where the alternating current component is substantially reduced leaving only the possibility of interference during the transition of the dial pulse signal from its most positive to its most negative level and vice versa. This possibility is eliminated by applying the filter output to a comparator circuit providing both an alternating and a direct current hysteresis.

6 Claims, 3 Drawing Figures

TELEPHONE DIAL PULSE DETECTION CIRCUIT

BACKGROUND OF THE INVENTION

This invention relates to telephone switching systems and more particularly to circuits in such systems adapted to receive control signals generated in subscriber or trunk lines of the system.

Longitudinal currents externally induced in telephone subscriber and trunk lines have long constituted a source of interference for the transmission of signals through those lines. When both sides of the transmission path are balanced with respect to ground, equal voltages are induced in each wire by stray electric or magnetic fields and the effect is minimal. If, on the other hand, the impedance of one wire to ground differs from that of the other, the induced currents do not cancel and the resultant appears as interfering noise. Even in balanced systems, subscriber loops exist in which, during dialing and other control functions, the line is effectively operated as an unbalanced circuit. In certain subscriber line arrangements the detection of dial pulses is accomplished by providing battery and ground from the central office to the subset through the line. By monitoring the ring conductor current a pulse detector senses the dial pulses generated at the subscriber subset. In the case of a two-party line, the party placing a call must be identified for billing purposes. For coin lines a signal must be transmitted to indicate the deposit of the appropriate coins. In the past the presence of these conditions on the lines have been sensed, in one arrangement, by connecting a level detector in the detection circuitry to the tip conductor and sensing the presence or absence of a ground at the subscriber subset. If ground is detected, a service request by the "tip party" is indicated in the case of a two-party line. In the case of a coin line this ground indicates the deposit of a coin.

Although the foregoing detection functions appear relatively simple to perform, they may be complicated by a number of external conditions including the aforementioned longitudinal alternating currents. These interfering currents may originate from a number of sources. In rural telephone exchanges, for example, subscriber lines are frequently carried to the central office for a considerable distance on utility poles which may also carry power company lines. When the latter lines conduct high voltage alternating current, the parallel extension of telephone and power lines presents the electrical equivalent of a transformer with the power lines constituting the primary winding. As a result, because of the distributed capacitance to ground of the telephone lines, an alternating current is induced into the subscriber line loop whether or not the loop circuit is complete. In the case of a tip party line, an unbalance is created when the subset dial contacts or the hookswitch contacts are open because of the additional current induced into the tip side as the result of the tip party ground. A balanced detector circuit which looks at both tip and ring conductor may, as a result, fail to operate properly when a line contains a tip party ground since the currents induced on the tip and ring conductors are not the same. This problem becomes particularly severe in detecting tip party dial pulses in the presence of high longitudinal currents. A dial pulse detector would have to respond to a relatively low amplitude direct current component of the ring conductor current without being adversely affected by a much greater longitudinal current component.

One object of this invention is thus the positive detection of signaling conditions on an unbalancd telephone line loop in the presence of externally induced longitudinal alternating current.

Another object of this invention is to provide a new and improved subscriber line dial pulse detection circuit.

It is also an object of this invention to increase the noise immunity of a telephone subscriber dial pulse detection circuit.

SUMMARY OF THE INVENTION

The foregoing and other objects of this invention are realized in one illustrative embodiment thereof for accepting dial pulses which comprises a battery to ground circuit including the ring and tip conductors of the tip party line loop and its dial contacts. Battery is applied to the ring side of the line and ground is connected at the tip side. Included in the battery-ground circuit is a resistor, the voltage signals developed across which are initially applied to a low-pass filter which substantially reduces a 60 Hz longitudinal signal, say, relative to the direct current dialing signal. The filter also acts as a threshold element ensuring that a minimum direct current signal on the line will cause the filter to saturate. The filtered signal is routed through a comparator and, after amplification, is made available to the telephone system scanner or other system control circuitry.

In accordance with one feature of this invention, a comparator circuit is employed having the characteristic of alternating current hysteresis. Longitudinal alternating current noise signals applied to the comparator would have little or no effect when its input is at its most positive or most negative level with respect to a change of state during the reception of dial pulses as long as the filter output voltage fails to cross the reference voltage level of the comparator. By feeding the comparator output voltage through a capacitor to modify the comparator reference voltage, an alternating current hysteresis is obtained which permits high levels of alternating current noise to be present during a transition in the dial pulse signal without causing splitting of the output signal. The same feedback circuitry employed to obtain the alternating current hysteresis may advantageously also generate a direct current hysteresis. The comparator circuit is thus further insensitized against high longitudinal noise when the incoming signal is at its highest or its lowest level.

BRIEF DESCRIPTION OF THE DRAWING

The organization and operation of this invention together with its objects and features will be better understood from a consideration of one illustrative embodiment thereof when taken in conjunction with the accompanying drawing in which.

DETAILED DESCRIPTION

Figure 1:
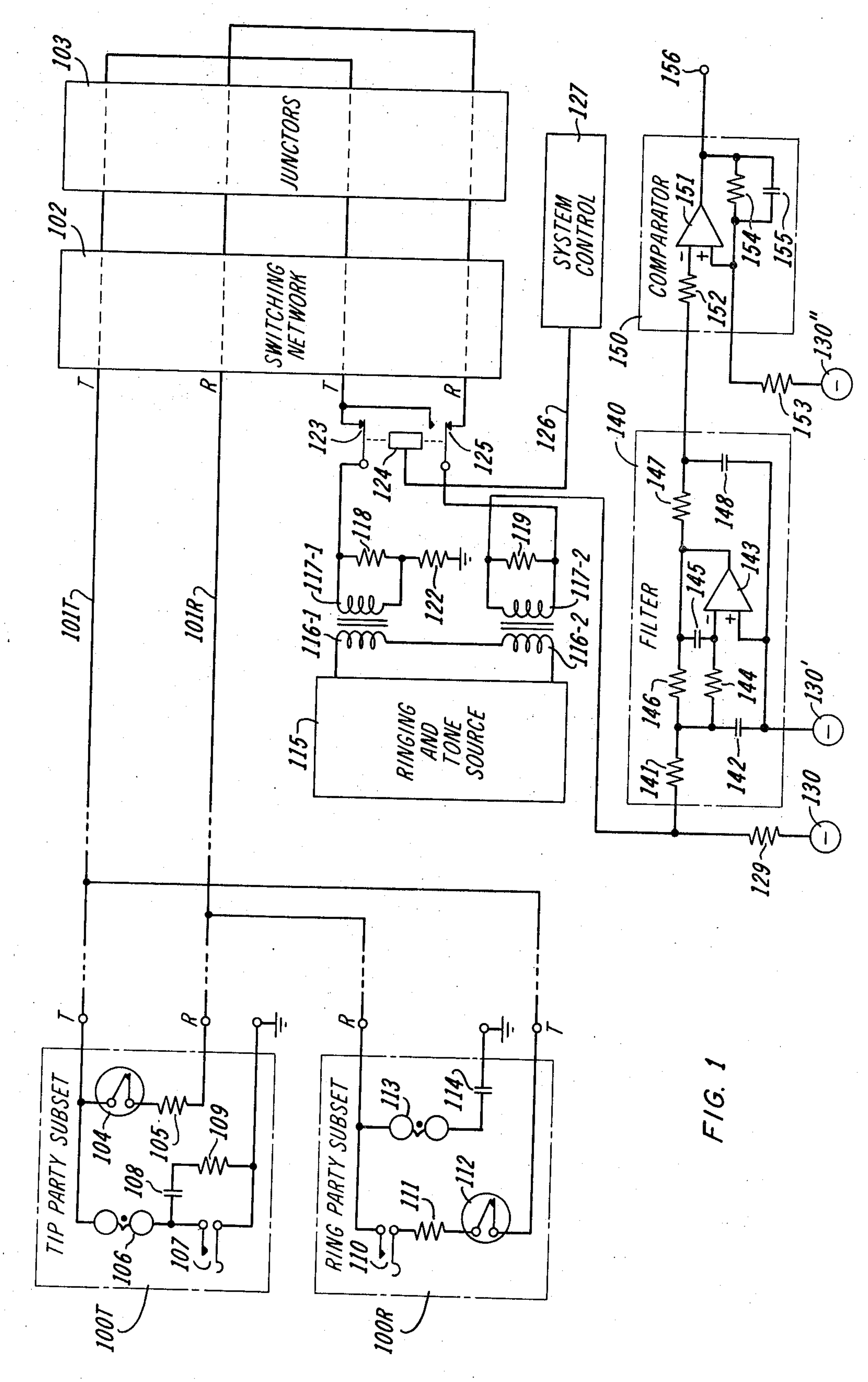
FIG. 1 depicts an illustrative dial pulse detector circuit according to this invention associated with a representative two-party telephone subscriber line connected thereto via a switching network.

A telephone system organization incorporating the dial pulse detection circuitry according to this invention is shown in FIG. 1 in only sufficient detail for its understanding. A single representative two-party subscriber line terminating in a tip party subset 100T and a ring party subset 100R is extended to the detection circuitry via tip and ring conductors 101T and 101R, a switching network 102, and its associated junctor group 103. The tip subset 100T conventionally comprises dial contacts 104 and a resistance 105 serially connected across the tip and ring conductors 101T and 101R. In addition, a ringer 106 and hookswitch contacts 107 are serially connected between the tip conductor 101T and ground. A capacitor 108 and a resistor 109 connected across the hookswitch contacts 107 provide a path to ground for ringing current.

The ring party subset 100R, shown only for completeness, has its ring terminal and tip terminal conventionally connected in parallel with the tip and ring conductors 101T and 101R, respectively. Serially connected across the ring and tip terminals are hookswitch contacts 110, subset resistance 111 and dial contacts 112. A ringer 113 is connected via a direct current blocking capacitor 114 to ground. Audible ring signals (as well as dial tone detected at the subsets 100T and 100R by receivers not shown) are provided by a ringing and tone source 115 selectively connectable to the two-party line by the network 102 via a conventional transformer arrangement comprising serially connected primary windings 116-1 and 116-2 coupled to secondary windings 117-1 and 117-2, respectively. The latter windings each have connected thereacross a resistor 118 and 119, respectively. The tip conductor 101T, for the dial pulse detection operation to be described, is extended to ground via a resistor 122 connected to resistor 118.

Although not essential to an understanding of this invention, to demonstrate further the system context in which it is advantageously adapted for use, a portion of a typical supervisory circuit is also included in the circuit of FIG. 1. Thus, the tip conductor 101T, after its extension through the network 102 and junctor group 103, is connected in the digit state to its transformer winding 117-1 via a break contact 123 controlled by a party test relay 124. Similarly, the ring conductor 101R, after an identical extension, is connected in the digit state to its transformer winding 117-2 via transfer contacts 125 also controlled by relay 124. Relay 124 is energized via a lead 126 extended to its system control circuitry 127. It will be appreciated that the system components so far referred to may take various and different forms for the functions to be described. In any event, they are readily envisioned by one skilled in the art and are for that reason shown only in block symbol form to avoid complexity.

Before proceeding to the details of the circuitry for detecting dial pulses according to this invention, circuits for detecting which of the two parties has requested service are briefly considered. When a request for service has been detected by system apparatus not comprising a part of this invention, the identity of the calling party is determined by the operation of party test relay 124 under the control of system control 127. Upon the operation of relay 124, the tip and ring conductors are opened at break contacts 123 and transfer contacts 125, respectively. At the latter contacts, the tip conductor 101T is connected to the ring side of transformer winding 117-2 thereby closing a supervisory circuit thereto at a point at the junction of resistor 119 and resistor 129, which circuit is extended to a source of negative potential 130. When the tip party subset 100T goes off-hook and contacts 107 are, as a result, closed, a circuit is completed from potential source 130 to the ground connection at one side of the contacts 107 which may be traced as follows: resistor 129, transfer contact 125, tip conductor 101T extended through junctor group 103 and network 102, ringer 106, and hook-switch contacts 107. The voltage developed across ring resistor 129 as the result of the current in the now closed circuit traced in the foregoing is sensed by level detector circuitry associated with the dial pulse detector, which level detector circuitry is not specifically shown as not comprising an essential part of this invention. The voltage across ring resistor 129 thus detected indicates the presence of ground at the calling subset which in turn, in this exemplary system organization, identifies the latter as the tip party of the two-party line. Had the ring party originated the call, no ground would have been detected as may be ascertained from a tracing of the ring party line loop bearing in mind the opening of the latter loop at the transfer contacts 125. It will be apparent that, upon the closing of hookswitch contacts 107, the tip party line presents an effectively unbalanced subscriber line in view of the grounding of the tip conductor 101T at the subset 100T with all of the vulnerability to externally induced alternating current noise discussed in the foregoing. Assuming the completion of party identification and the restoration of party test relay 124 and its contacts 123 and 125, this unbalanced state continues preparatory to and during the generation of dial pulses at the subset 100T by the dial contacts 104. A dial pulse circuit including the latter contacts is completed by the restoration of the party test relay 124 also traceable from the potential source 130 and including the ring resistor 129. Current interruptions generated in a conventional manner by the operation of the subset dial contacts 104 are reflected as voltage signals across the ring resistor 129.

These signals are applied to a detector circuit according to this invention comprising the combination of a low-pass, active filter circuit 140 and a comparator circuit 150. The filter 140 comprises two sections associated with a differential amplifier input having a third section at its output. A first section comprising a resistor 141, connected at one end to the ring resistor 129, and a capacitor 142 constitute the input section to filter 140. A second section is comprised of resistor 144 and capacitor 145 in parallel with resistor 146. Resistor 146 connected between the amplifier 143 output and resistor 141 determines the inband voltage gain of amplifier 143. The third filter section comprises a resistor 147 and a capacitor 148 connected at the output of amplifier 143. A reference voltage level for the latter amplifier is provided at its noninverting input by connection to a reference potential source 130′.

The output of filter 140 is applied to a comparator 150 comprising a second differential amplifier 151 having its inverting input connected to the output of amplifier 143 output filter section via a resistor 152. The other input to amplifier 151 provides a voltage reference level by connection to the potential source 130″ via a resistor 153. An RC feedback network comprising a resistor 154 and a capacitor 155 is connected between the output of amplifier 151 and the aforementioned other of its inputs. The output of amplifier 151 is also connected to an output terminal 156 where the output signals to be described are made available for amplification and transmission to other control circuits of the telephone system for establishing the call dialed.

Figure 2B:
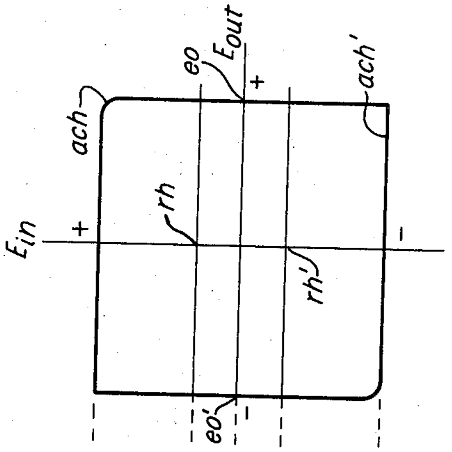
FIG. 2A and 2B graphically depict particular signal conditions at points in the circuit of FIG. 1 during a dial pulse detection operation.
Figure 2A:
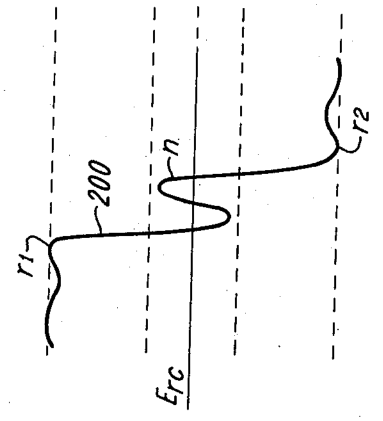

With the foregoing organization of an illustrative embodiment of this invention in mind, a typical dial pulse detection operation may now be considered with particular reference to the signal voltage waveforms of FIG. 2A and 2B. Assuming, as in the foregoing, the off-hook state of the tip party subset 100T with the closure of contacts 107, the unbalanced line presents two paths to ground for a direct current from source 130. The first ground is connected at the subset 100T to the hookswitch contacts 107. The second path to ground is extended via tip conductor 101T, network 102, and junctor group 103 through resistor 122. A direct current in the dial contact circuit is conventionally interrupted by the operation of the dial and its contacts to produce the dial pulses which are reflected across ring resistor 129 as voltage pulses rising and falling about the amplifier 143 reference voltage level. These voltage pulses are initially applied to the first section of filter 140 where a first attenuation of any alternating current component is accomplished by the first filter section comprising resistor 141 and capacitor 142. The second section of filter 140 achieves further attenuation of out-of-band alternating current noise by applying an out-of-phase feedback to amplifier 143. The filter 140 advantageously acts as a threshold element as the result of suitably setting its reference voltage level and adjusting the value of ring resistor 129 and the inband filter gain so that a minimum direct current dial signal will cause the amplifier 143 to saturate. The output of filter 140 is thus at its most positive or most negative level depending upon the presence or absence of an inband input signal. A final attenuation of the externally induced noise is accomplished by the amplifier 143 output filter section comprising resistor 147 and capacitor 148. A typical portion of a filter 140 output waveform is depicted in FIG. 2A as the leading edge 200 falling from dial contacts 104 open state at region *rl* to contacts 104 closed state at region r2. The dial pulse signal is shown as applied to the comparator 150 varying about the reference voltage level $E_{rc}$ of the latter circuit. As will become apparent hereinafter, any remaining noise at the regions *r1* and *r2* will not seriously affect a dial pulse signal as long as such an alternating current noise extends from *r1* through the reference voltage level $E_{rc}$ and crosses *rh'* (or extends from *r2* through the reference voltage level $E_{rc}$ and crosses *rh*). The first stage in the reconstruction of an AC noise distorted dial pulse is thus completed.

The transition of the dial pulse leading edge 200 shown in FIG. 2A from its most positive to its most negative level presents a more serious problem in the presence of an alternating current component. It will be appreciated that any such component of sufficient magnitude appearing during the transition could cause multiple switching of differential amplifier 151 between its two output states thereby in turn splitting a dial pulse. Additional and spurious pulses can thus be generated. This problem is advantageously overcome by adding hysteresis to the characteristics of comparator 150. To achieve this hysteresis, an RC feedback network comprising parallelly connected resistor 154 and capacitor 155 is coupled from the output of amplifier 151 to an input connected to potential source 130' through resistor 153. The effect of the hysteresis may now be considered with particular reference to FIG. 2B in which the comparator input and output states are graphically compared. Assuming an output voltage condition of amplifier 151 as positive and of the value eo and sufficient time has elapsed for capacitor 155 to become fully charged, then the reference voltage level of amplifier 151 is shifted positively to voltage level point rh as determined by the values of output voltage *eo* and the values of divider resistors 153 and 154. Capacitor 155 charges to (*eo* - *rh*) and the value of *eo* will remain constant as long as the input voltage $E_{in}$ is more negative than the reference voltage *rh*. The instant the input voltage $E_{in}$ rises above *rh*, the output of amplifier 151 switches to the opposite state of voltage level *eo'* along the direct current hysteresis curve *rh*. Since the voltage across capacitor 155 cannot change instantaneously, the noninverting input voltage (+) of amplifier 151 rises to the algebraic sum of its output voltage and the voltage across capacitor 155, 2*eo* - *rh* (*ach'* in FIG. 2B). As a result, during the transition of the dial pulse signal input, an alternating current noise depicted in FIG. 2A as the minor waveform *n* would have to go more negative than the foregoing sum reference voltage to cause the amplifier 151 to switch its output state. Capacitor 155 now discharges and eventually recharges to the opposite polarity of the value *rh* - *eo'* (ach in FIG. 2B) at which level insurance is again provided against spurious generation of a dial pulse signal by AC noise during the pulse transition.

The direct current hysteresis introduced by feedback resistor 154 also advantageously contributes to the stability of comparator 150. Again as determined by the values of divider resistors 153 and 154, the reference voltage level of amplifier 151 is shifted in either direction to levels *rh* and *rh'*. This direct current hysteresis acts, during the discharge of capacitor 155 and the resulting reduction in the threshold voltage level of amplifier 151 from the sum voltage level previously considered, to prevent AC noise such as the noise at *r1* or *r2* from causing a switch of the latter amplifier to its opposite state. Pulse splitting during capacitor 151 discharge is thus also effectively prevented.

What has been described is considered to be only one illustrative embodiment of this invention and various and numerous other arrangements may be devised by one skilled in the art without departing from the spirit and scope thereof as defined by the accompanying claims.

What is claimed is:

1. An electrical circuit for detecting telephone line dial pulses comprising a filter circuit means for passing incoming signals from said line of frequencies of said dial pulses and for suppressing signals of other frequencies occurring on said line during and between said dial pulses, said filter means including differential amplifier means for generating a first output voltage responsive to the presence of a dial pulse and for generating a second output voltage responsive to the absence of a dial pulse, a comparator circuit having a first and a second input, said first input being adapted to receive said filter circuit means output voltages, a source of reference voltage connected to said second input, said comparator circuit generating a first comparator output voltage of one level when said first filter circuit means output voltage is positive with respect to said reference voltage and for generating a second comparator output voltage of another level when said filter circuit means output voltage is negative with respect to said reference voltage, and means for delaying the transition between said first and second comparator output voltages in the presence of signals of frequencies other than the frequency of said dial pulses comprising a resistive-capacitive feedback network for coupling a portion of said first and second comparator output voltages to said second input to shift said reference voltage beyond the amplitude of said last-mentioned signals.

2. An electrical circuit for reconstructing telephone line dial pulses distorted by higher frequency alternating current noise on said line comprising a filter circuit for suppressing said alternating current noise, said filter circuit including a first differential amplifier operated in saturation to generate a first maximum output voltage of one polarity responsive to the presence of an inband dial pulse and to generate a second maximum output voltage of the opposite polarity responsive to the absence of an inband dial pulse, a second differential amplifier having a first and a second input, said first input being adapted to receive said first amplifier output voltages, a source of reference voltage connected to said second input, said second amplifier generating a first output voltage of one level when said filter output voltage is positive with respect to said reference voltage, said second amplifier generating a second output voltage of a second level when said filter output voltage is negative with respect to said reference voltage, and means for rendering said second amplifier unresponsive to said higher frequency alternating current noise occurring during a transition between said first maximum output voltage and said second maximum output voltage comprising means for providing an alternating current hysteresis for said second amplifier comprising a capacitive feedback path for coupling a portion of said second amplifier output voltages to said second input to shift said reference voltage beyond the amplitude of said alternating current noise.

3. An electrical circuit as claimed in claim 2 also comprising means for providing a direct current hysteresis for said second amplifier comprising a resistive feedback path for also coupling a portion of said second amplifier output voltages to said second input to also shift said reference voltage beyond the amplitude of said alternating current noise.

4. In a telephone system, in combination, an unbalanced subscriber line including contact means for producing direct current pulses on said line, a first differential amplifier for generating a first maximum output voltage of one polarity responsive to the presence of a direct current pulse of a predetermined amplitude on said line and for generating a second maximum output voltage of the opposite polarity responsive to the absence of a direct current pulse on said line, and means for rejecting alternating current noise signals during the transition between said first and second output voltages comprising a source of reference voltage, a second differential amplifier operated responsive to said first and second output voltages for generating a first digital signal voltage when said first output voltage rises positively with respect to said reference voltage and for generating a second digital signal voltage when said second output voltage falls negatively with respect to said reference voltage, and a capacitive feedback path for said second amplifier for coupling a portion of said first and second digital signal voltages with said reference voltage to shift said reference voltage beyond the amplitude of either alternation of said alternating current noise signals.

5. In a telephone system, the combination according to claim 4 also comprising a resistive feedback path for said second amplifier for coupling a portion of said first and second digital signal voltages with said reference voltage to shift said reference voltage beyond the amplitude of either alternation of said alternating current noise signals upon a reduction of said portion of said first and second digital signal voltages in said capacitive feedback path.

6. In a telephone system, the combination according to claim 5, also comprising filter network means associated with said first differential amplifier for initially suppressing said alternating current noise signals.

* * * * *

UNITED STATES PATENT OFFICE

CERTIFICATE OF CORRECTION

Patent No. 3,772,477 Dated November 13, 1973

Inventor(s) Lee W. Richards

It is certified that error appears in the above-identified patent and that said Letters Patent are hereby corrected as shown below:

Column 2, line 4, "an unbalancd telephone" should read --an unbalanced telephone--. Column 4, line 1, "a point at the junction" should read --one end--. Column 4, line 2, "and resistor 129" should be deleted. Column 4, line 2, "extended" should read --extended from the other end of resistor 119--. Column 4, line 3, "potential 130" should read --potential 130 via a resistor 129.--. Column 4, line 8, "129, transfer" should read --129, resistor 119, transfer--. Column 5, line 50, "and crosses" should read --to, but does not cross,--. Column 5, line 51, "and crosses" should read --to, but does not cross,--. Column 6, line 6, "eo" should be italicized.

Signed and sealed this 23rd day of July 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
U.S. GOVERNMENT PRINTING OFFICE : 1969 O—366-334